(12) United States Patent
Vadnais et al.

(10) Patent No.: US 7,480,836 B2
(45) Date of Patent: Jan. 20, 2009

(54) MONITORING ERROR-HANDLER VECTOR IN ARCHITECTED MEMORY

(75) Inventors: Kevin Bruce Vadnais, Nampa, ID (US); Dale K. McCluskey, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 537 days.

(21) Appl. No.: 11/113,661

(22) Filed: Apr. 25, 2005

(65) Prior Publication Data
US 2006/0242471 A1 Oct. 26, 2006

(51) Int. Cl.
*G06F 11/00* (2006.01)
(52) U.S. Cl. ........................................ 714/52
(58) Field of Classification Search ................ 714/52
See application file for complete search history.

(56) References Cited

U.S. PATENT DOCUMENTS

| | | | | |
|---|---|---|---|---|
| 4,779,187 A * | 10/1988 | Letwin | ......................... | 712/229 |
| 4,825,358 A * | 4/1989 | Letwin | ............................ | 713/1 |
| 5,012,514 A * | 4/1991 | Renton | ......................... | 713/192 |
| 5,027,273 A * | 6/1991 | Letwin | ......................... | 713/600 |
| 5,511,184 A * | 4/1996 | Lin | ............................. | 710/261 |
| 5,561,788 A * | 10/1996 | Letwin | ......................... | 703/22 |
| 5,604,864 A * | 2/1997 | Noda | ........................... | 714/47 |
| 5,684,875 A * | 11/1997 | Ellenberger | .................... | 482/4 |
| 6,532,529 B1 * | 3/2003 | Hongo | ........................ | 711/220 |
| 6,598,137 B1 * | 7/2003 | Yaegawa et al. | ............. | 711/165 |
| 6,741,529 B1 * | 5/2004 | Getreuer | ................... | 369/30.17 |
| 6,859,855 B1 * | 2/2005 | Shimizu | ...................... | 711/103 |
| 7,093,239 B1 * | 8/2006 | van der Made | ............. | 717/135 |
| 7,114,066 B1 * | 9/2006 | Swaminathan | ................. | 713/1 |
| 7,284,084 B2 * | 10/2007 | Atherton et al. | ............. | 711/102 |
| 2003/0005265 A1 | 1/2003 | Barowski | | |
| 2006/0064528 A1 * | 3/2006 | Soltis et al. | .................. | 710/260 |
| 2006/0087885 A1 * | 4/2006 | Murakami et al. | ...... | 365/185.17 |
| 2006/0101181 A1 * | 5/2006 | Post et al. | .................... | 710/266 |

* cited by examiner

*Primary Examiner*—Michael C Maskulinski
*Assistant Examiner*—Neil D Miles

(57) ABSTRACT

A computer system provides a vector monitor for monitoring a first instance of an error-handling vector in architected memory. The monitoring can involve repeatedly comparing the first instance with a second instance of the vector so as to detect a mismatch, should it occur. If a mismatch is detected, the vector monitor can notify an administrator, automatically initiate diagnostic routines, and/or correct the mismatch. As a result, potential fatal events in which firmware confronts a corrupted error-handling vector are less likely to occur.

10 Claims, 2 Drawing Sheets

MONITORING ERROR-HANDLER VECTOR IN ARCHITECTED MEMORY

BACKGROUND OF THE INVENTION

The present invention relates to computers and, more particularly, to error-handling in computers. In this specification, related art labeled "prior art" is admitted prior art; related art not labeled "prior art" is not admitted prior art.

Typically, when computers are powered on, firmware guides the initialization process until an operating system can assume control by causing itself and other programs to be executed on one or more processors. Once the operating system is running, it provides most of the functionality including managing programs and handling errors. To the latter end, the operating system stores a vector (pointer) to these error-handler routines in architected memory that the firmware is hard-wired to check in certain error-handling scenarios. Thus, when the firmware is required to handle an error, e.g., one that requires reinitialization of a processor on which an operating system is running, the firmware can read the vector to determine where the error-handling routines are stored so it can use them in helping the computer to recover.

SUMMARY OF THE INVENTION

In the course of the present invention it was discovered that corruption of error-handler vectors relied on by the firmware, while infrequent, can occur, e.g., they can be overwritten by defective software. When such corruption occurs, it can have a serious negative impact on performance and the user experience. In particular, corruption of the firmware-accessible vectors to error handlers prevents graceful recovery from errors in which the operating system must be suspended.

Accordingly, the present invention, as defined in the claims, provides for vector corruption detection, e.g., by a background vector-monitor process or daemon. For example, the vector monitor can compare the error-handler vectors written by the operating system into architected memory with one or more copies of the vectors. A mismatch can indicate the vectors have been corrupted. If vector corruption is detected, the vector monitor can notify a user or administrator, correct the mismatch, and/or initiate a diagnostic routine. In general, the present invention helps ensure the graceful recovery promised by firmware-directed error handling. These and other features and advantages of the invention are apparent from the description below with reference to the following drawings.

DETAILED DESCRIPTION

Figure 1:
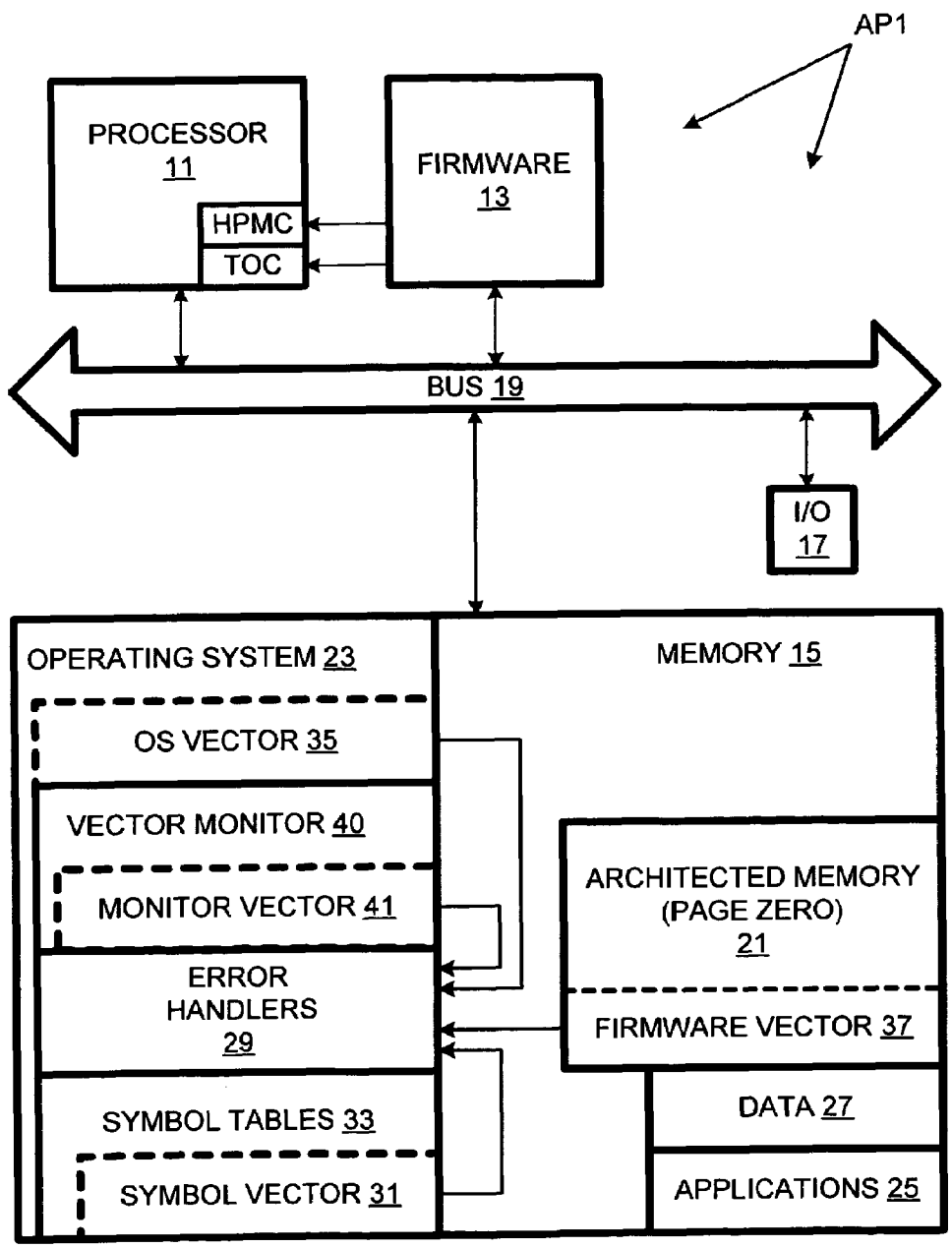
FIG. 1 is a schematic block diagram of one of many computer systems provided for by the present invention.

A computer system AP1 in accordance with the present invention comprises a processor 11, firmware 13, memory 15, input/output (I/O) devices 17, and an interconnecting bus 19, as shown in FIG. 1. Memory 15 includes both disk-based memory and solid-state memory, e.g., RAM. Memory 15 includes architected memory 21, which is memory in which the values for predetermined parameters are stored at predetermined physical locations. In the illustrated embodiment, processor 11 is a PA-RISC processor and architected memory 15 is Page zero. Placing a value in architected memory permits firmware 13 to find information independent of any dynamic memory allocation scheme. Memory 15 further stores an operating system 23, other applications 25, data 27, and error-handling routines (error handlers) 29. Operating system 21 is HP-UX, a UNIX variant available from Hewlett-Packard Company.

Operating system 23 actually uses storage of its code in two forms: its code lies completely on hard disk initially, and is loaded into RAM upon boot-up. In an alternative embodiment, not all of the operating system is loaded into RAM upon boot-up, but is loaded into RAM on an as-needed basis to save limited RAM capacity. For example, the actual code for an error handler may not be loaded into RAM upon boot, but a vector pointing to the location of the error handler can be quickly found in a symbol table at a known storage address on the disk.

In the illustrated embodiment, an instance 31 of the error-handler vector in a symbol table 33 is copied during boot-up to RAM, to form "operating-system" vector 35; operating system 23 then copies vector 35 to a dedicated location in architected memory 21, where it takes the form of firmware-accessible error-handler vector 37.

Operating system 23 also loads a vector monitor 40 into RAM during boot up. Vector monitor 40 runs as a background process and, as part of the boot up process, copies firmware vector 37 to RAM in the form of "monitor" vector 41. Thus, in system AP1, there are four instances of the error-handling vector, "symbol" vector 31 on disk in symbol table 33, firmware vector 37 in architected memory 21, and monitor vector 41 managed by vector monitor 40, and, operating-system vector 35.

Vector monitor 40 repeatedly checks firmware vectors 37 for corruption by comparing them with its copy 41. When vector monitor 40 determines that its instance 41 and the instance 37 in architected memory match, it does nothing. If a mismatch is detected, vector monitor 40 takes a user-configurable action. Vector monitor 40 can be configured to notify a user or administrator in a variety of ways, e.g., by a message on a display for system AP1 (assuming a workstation instead of a server), by email, by voicemail, or by simply logging the problem in an error log. The person notified can then take action to correct the mismatch and/or perform diagnostics.

Vector monitor 40 can also be configured to perform automatically many of the actions that an administrator might perform, e.g., automatically correct a mismatch or to initiate diagnostics. For example, vector monitor 40 can be configured to examine the operating system instance 35 of the error handling vectors and/or the symbol table instance 31 of the vectors to determine whether it is the firmware vectors 37 or the monitor vectors 41 that have been changed. Once the victim of the corruption is identified, it can be overwritten with a correct value. In an alternative embodiment, the vector monitor does not maintain its own instance of error-handling vectors, but uses the instance maintained in RAM by the operating system; in this case, an instance in the symbol table is used to determine which instance in RAM is corrupt when a mismatch is detected.

Vector monitor 40 can also initiate diagnostic procedures. For example, vector monitor can cause firmware 13 to assert a "transfer-of-control" (TOC) signal or a "high-priority machine check" (HPMC) signal to processor 11. Processor 11 is a PA-RISC processor available from Hewlett-Packard Company; alternatively, an Itanium processor available from Intel Corporation supports similar signals. If vector monitor 40 has already corrected the mismatch, there is also the option of having firmware 13 perform diagnostics while operating system 23 is suspended. In some multi-partition embodiments of the invention, processes running on a partition on which a mismatch is detected can be transferred to other partitions so that the incorporating computer system can remain operational. Note that in a multi-partition system, each partition can have its own vector monitor.

Figure 2:
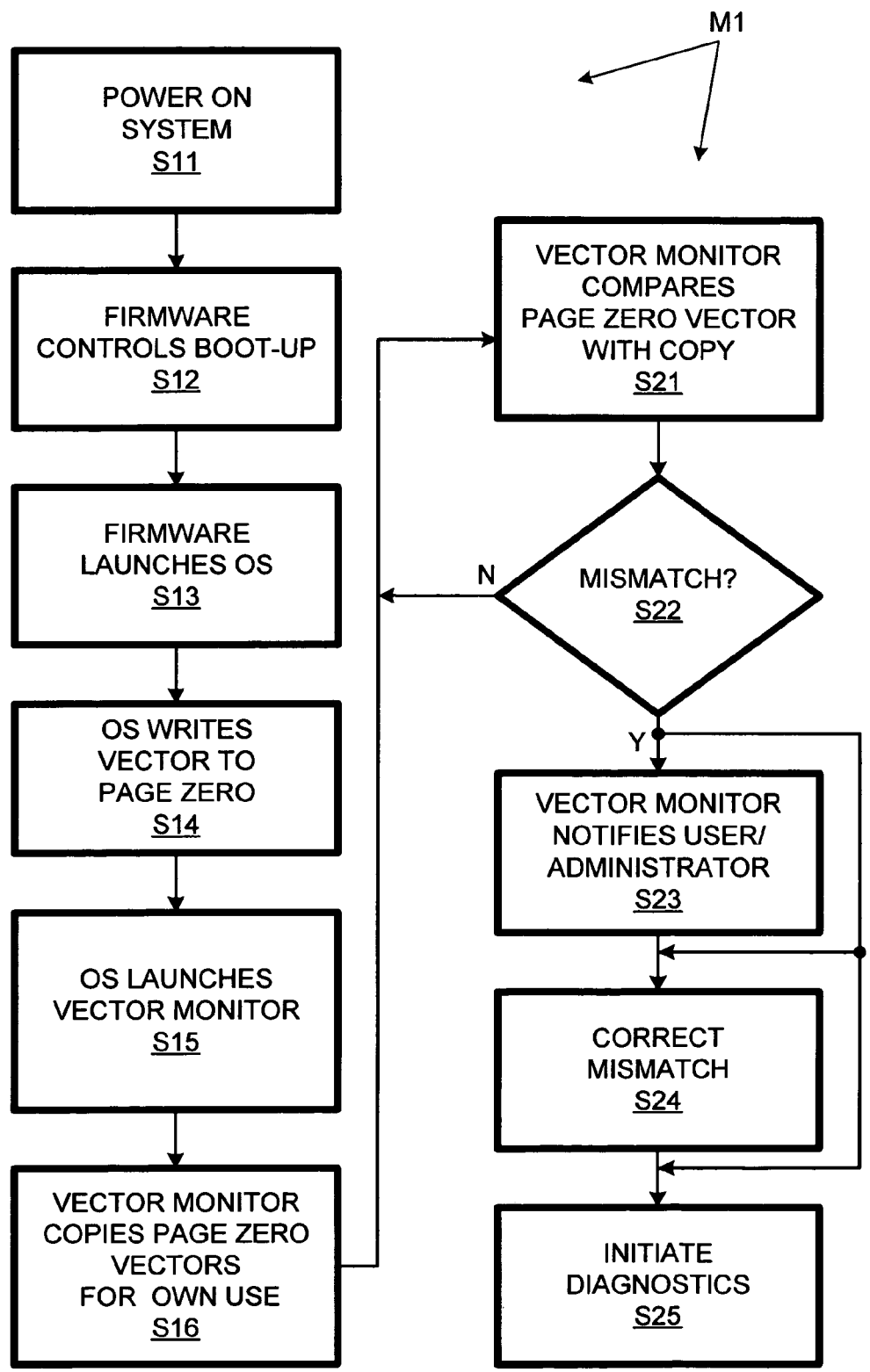
FIG. 2 is a flow chart of one of many possible methods provided for by the present invention.

One of many possible methods provided by the present invention and used in connection with computer system AP1 is flow charted in FIG. 2. At method segment S11, computer system AP1 is turned on. At method segment S12, firmware 13 directs the power-on sequence; at method segment S13, firmware 13 launches operating system 23, which examines the hardware configuration of computer system AP1 and determines physical memory allocations for non-architected memory.

At method segment S14, operating system 23 writes its error-handler vector 35 to architected memory 21, resulting in vector instance 37. At method segment S15, operating system 23 launches vector monitor 40, which reads firmware-accessible error-handler vector 37 to make its copy 41 at method segment S16.

Once the boot-up process is complete, vector monitor 40 repeatedly compares firmware vectors 37 with monitor vectors 41 at method segment S21. If a match is found at method segment S22, method M1 returns to method segment S21. If a mismatch is detected at method segment S22, a user-configurable action is taken that can include notification at method segment S23, correction at method segment S24, and initiating diagnostic procedures at method segment S25.

Herein, "error handler" encompasses interrupt handlers as well as other types of error-related events. An "error-handler" vector is a value that refers to a location in memory of an error-handling routine. The vector may point directly or indirectly to such a location. In a single partition system, the vector can point directly to the location of an error handling routine. In a multiple partition system (with multiple instances of an operating system, each with its own vector monitor), the vector in architected memory can point to a location which stores a procedure that provides the correct vector for the partition requesting error handling. By "copy" is meant the underlying information is the same, even if the format of the information is different.

A user or an administrator, once notified, can take any of many possible diagnostic and/or corrective actions. These include running diagnostic routines, reinitializing the processor and operating system with or without specifying additional diagnostic processes running in the background. In principle, any set of procedures that an administrator can implement can also be automated in firmware and software. These and other variations upon and modifications to the illustrated embodiment are provided for by the present invention, the scope of which is defined by the following claims.

What is claimed is:

1. A system comprising:
   a processor;
   firmware;
   computer-readable media including
      an error-handling routine,
      at least two instances of a vector pointing to said error-handling routine, at least a first instance of said vector being accessible to said firmware,
      a vector monitor for detecting corruption of said first instance, said vector monitor including means for sending a notification to a human administrator in the event it detects said corruption; and
      an operating system for launching said vector monitor.

2. A system comprising:
   a processor;
   firmware;
   computer-readable media including
      an error-handling routine,
      at least two instances of a vector pointing to said error-handling routine, at least a first instance of said vector being accessible to said firmware,
      a vector monitor for detecting corruption of said first instance, said vector monitor including means for automatically correcting said corruption when it is detected as a function of at least one of said other instances; and
      an operating system for launching said vector monitor.

3. A system as recited in claim 2 wherein said vector monitor automatically corrects said corruption as a function of at least one uncorrupted instance of said at least two instances of said vector.

4. A system comprising:
   a processor;
   firmware;
   computer-readable media including
      an error-handling routine,
      at least three instances of a vector pointing to said error-handling routine, at least a first instance of said vector being accessible to said firmware,
      a vector monitor for detecting corruption of said first instance, said detecting involving comparing said first instance of said vector with at least two other instances of said vector; and
   an operating system for launching said vector monitor.

5. A method comprising:
   firmware launching an operating system;
   said operating system launching a vector monitor;
   said vector monitor detecting corruption of a first instance of a vector pointing to an error-handling routine; and
   automatically correcting said corrupted instance using at least one other instance of said vector.

6. A method comprising:
   firmware launching an operating system;
   said operating system launching a vector monitor;
   said vector monitor detecting corruption of a first instance of a vector pointing to an error-handling routine; and
   running diagnostic procedures to determine the cause of said corruption.

7. A method comprising:
   firmware launching an operating system;
   said operating system launching a vector monitor; and
   said vector monitor detecting corruption of a first instance of a vector pointing to an error-handling routine, said detecting involving comparing said first instance with at least two other instances of said vector.

8. Computer-readable media comprising:
   a vector monitor that monitors a first instance of an error-handler vector so that said vector monitor detects corruption of said first instance, said first instance of said error-handler vector being in architected memory, said vector monitor sending a human cognizable notification of said corruption; and
   an operating system for launching said vector monitor.

9. Computer-readable media comprising:
   a vector monitor that monitors a first instance of an error-handler vector so that said vector monitor detects corruption of said first instance, said first instance of said error-handler vector being in architected memory, said vector monitor automatically initiating a diagnostic routine when said corruption is detected to determine the cause of said corruption; and an operating system for launching said vector monitor.

10. Computer-readable media comprising:

a vector monitor that monitors a first instance of an error-handler vector so that said vector monitor detects corruption of said first instance, said first instance of said error-handler vector being in architected memory, said vector monitor detecting said corruption by comparing said first instance with at least two other instances of said vector, said vector monitor automatically correcting said corruption; and an operating system for launching said vector monitor.

* * * * *

UNITED STATES PATENT AND TRADEMARK OFFICE
CERTIFICATE OF CORRECTION

PATENT NO.         : 7,480,836 B2
APPLICATION NO. : 11/113661
DATED              : January 20, 2009
INVENTOR(S)        : Kevin Bruce Vadnais et al.

It is certified that error appears in the above-identified patent and that said Letters Patent is hereby corrected as shown below:

In column 4, lines 64-66, in Claim 9, delete "so that said vector monitor detects corruption of said first instance, said first instance of said error-handler vector being in architected memory," and insert -- in architected memory so that it detects corruption of said first instance, --, therefor.

In columns 5-6, lines 7-8 and line 1, in Claim 10, delete "so that said vector monitor detects corruption of said first instance, said first instance of said error-handler vector being in architected memory," and insert -- in architected memory so that it detects corruption of said first instance, --, therefor.

Signed and Sealed this

Nineteenth Day of May, 2009

JOHN DOLL
*Acting Director of the United States Patent and Trademark Office*